(12) United States Patent
Chen et al.

(10) Patent No.: US 9,289,842 B2
(45) Date of Patent: Mar. 22, 2016

(54) STRUCTURE AND METHOD OF BONDING COPPER AND ALUMINUM

(71) Applicant: GM GLOBAL TECHNOLOGY OPERATIONS LLC, Detroit, MI (US)

(72) Inventors: Chih-Chang Chen, Rochester Hills, MI (US); Corey Simone, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 616 days.

(21) Appl. No.: 13/741,454

(22) Filed: Jan. 15, 2013

(65) Prior Publication Data
US 2014/0197148 A1 Jul. 17, 2014

(51) Int. Cl.
*B23K 9/00* (2006.01)
*B23K 33/00* (2006.01)
(Continued)

(52) U.S. Cl.
CPC .............. *B23K 9/0008* (2013.01); *B23K 9/232* (2013.01); *B23K 9/235* (2013.01); *B23K 35/286* (2013.01); *B23K 35/302* (2013.01); *B23K 35/365* (2013.01); *B32B 15/01* (2013.01); *B32B 15/017* (2013.01); *B23K 2203/10* (2013.01); *B23K 2203/12* (2013.01); *Y10T 428/12736* (2015.01)

(58) Field of Classification Search
CPC ...... B23K 9/0008; B23K 9/232; B23K 9/235; B23K 35/286; B23K 35/302; B23K 35/365; B23K 2203/10; B23K 2203/12; B32B 15/01; B32B 15/017; Y10T 428/12736
USPC ........ 219/76.14, 121.11–121.17, 136, 137 R; 428/650
See application file for complete search history.

(56) References Cited

U.S. PATENT DOCUMENTS 5,603,853 A * 2/1997 Mombo-Caristan . B23K 15/006
219/121.14
6,173,886 B1 1/2001 McCay et al.
(Continued)

FOREIGN PATENT DOCUMENTS

CN 1767922 A 5/2006
CN 101596632 A 12/2009
(Continued)

OTHER PUBLICATIONS http://www.fronius.com/cps/rde/xbcr/SID-D6745FEB-460FB49A/fronius_usa/22_cmt_the_new_revolution_in_digital_gma_welding_gb.pdf.
(Continued)

*Primary Examiner* — Dana Ross
*Assistant Examiner* — Lindsey C Teaters
(74) *Attorney, Agent, or Firm* — Quinn Law Group, PLLC

(57) ABSTRACT

A bonded structure of aluminum and copper is formed by bonding a copper workpiece and an aluminum workpiece together along a joint via an arc welding process. The copper workpiece has a first coating, having a lower melting point than copper, applied to at least a portion of it. The first coating allows the copper workpiece to be wetted and brazed, while the aluminum workpiece is melted and fused along the joint. The arc welding process involves the cyclic alternating of a first stage, in which an electric current is supplied to a welding wire as it is moved toward the workpieces, and a second stage, in which the electric current is reduced and the welding wire is moved away from the workpieces, to generate and detach a plurality of molten droplets along the joint. Each molten droplet is formed from the welding wire in the first stage.

15 Claims, 2 Drawing Sheets

(51) Int. Cl.
*B23K 35/30* (2006.01)
*B32B 15/01* (2006.01)
*B32B 15/10* (2006.01)
*B23K 9/23* (2006.01)
*B23K 9/235* (2006.01)
*B23K 35/28* (2006.01)
*B23K 35/365* (2006.01)

(56) References Cited

U.S. PATENT DOCUMENTS

| 2006/0272749 | A1 | 12/2006 | Spriestersbach et al. |
| 2007/0045237 | A1* | 3/2007 | Matz ................ B23K 35/22 219/74 |
| 2007/0145028 | A1* | 6/2007 | Artelsmair ......... B23K 9/1675 219/137.71 |
| 2009/0001141 | A1* | 1/2009 | Spriestersbach ....... B23K 1/005 228/223 |
| 2009/0026188 | A1 | 1/2009 | Schorghuber |
| 2009/0045172 | A1 | 2/2009 | Van Erk |
| 2010/0319751 | A1* | 12/2010 | Day ............... H01L 31/022425 136/244 |

FOREIGN PATENT DOCUMENTS

| CN | 101754831 A | 6/2010 |
| JP | 2008221297 A | 9/2008 |

OTHER PUBLICATIONS http://www.fronius.com/cps/rde/xbcr/SID-965852E2-198A4672/fronius_international/M_06_0001_EN_leaflet_CMT_121_www_44211_snapshot.pdf.

* cited by examiner

STRUCTURE AND METHOD OF BONDING COPPER AND ALUMINUM

STATEMENT REGARDING FEDERALLY SPONSORED RESEARCH OR DEVELOPMENT

This invention was made with U.S. Government support under an Agreement/Project Z264-DPN and Z411-DPN. The U.S. government may have certain rights in this invention.

TECHNICAL FIELD

The present invention relates to a bonded structure of copper and aluminum, and a method of bonding a copper workpiece and an aluminum workpiece together to form the bonded structure.

BACKGROUND

Aluminum and copper are two of the most widely used conductor materials due to their high conductivity and relatively low cost. As such, it is often desired to join, such as by welding, copper components and aluminum components to each other to be part of an electric circuit in various applications, such as in hybrid electrical vehicles. However, this is known to be difficult to accomplish due to the differing melting points and thermal conductivities of aluminum and copper. In addition, a liquid mixture of aluminum and copper forms hard and brittle intermetallics as it solidifies and cools. Two commonly used joining methods are ultrasonic welding and laser welding processes.

SUMMARY

A method of bonding a first metallic workpiece to a second metallic workpiece, where the two workpieces are made of materials having different melting points and thermal conductivities, is provided. The materials of the first metallic workpiece and the second metallic workpiece may be copper and aluminum, respectively. The method allows the two workpieces to be bonded without the creation of intermetallics between the two workpieces.

The method includes first applying a first coating to at least a portion of the first metallic workpiece, the portion encompassing at least the area that the bonding is to occur. The material of the first coating generally has a lower melting point than the material of the first metallic workpiece, and may include, but is not limited to, zinc. Prior to applying the first coating, the method may include applying a second coating to substantially the same portion of the first metallic workpiece to which the first coating is to be applied. The material of the second coating generally has a higher melting point than the material of the first metallic workpiece, and may include, but is not limited to, nickel.

After applying the first coating and, optionally, the second coating, the method then includes positioning the first metallic workpiece and the second metallic workpiece with respect to each other to form at least one joint where the two metallic workpieces are to be bonded. The workpieces are then welded together along the at least one joint via an arc welding process such that the first metallic workpiece side of the at least one joint is wetted and brazed, and the second metallic workpiece side of the at least one joint is melted and fused.

The arc welding process involves the alternating of a first stage and a second stage to generate and detach a plurality of molten droplets along the at least one joint, thereby creating the bond between the two workpieces. In the first stage, an electric current is supplied to a welding wire as it is moved toward the workpieces. In the second stage, the electric current is reduced, and the welding wire is moved away from the workpieces. The molten droplets are formed from the welding wire in the first stage. The material of the welding wire may include, but is not limited to, an aluminum alloy.

A bonded structure of copper and aluminum is also provided. The bonded structure may be formed by the method above. The bonded structure includes a first metallic workpiece made of copper, and a second metallic workpiece made of aluminum. The first metallic workpiece has a first coating applied to at least a portion of the first metallic workpiece. The material of the first coating generally has a lower melting point than copper, and may include, but is not limited to, zinc. The first metallic workpiece may further have an optional second coating between the first metallic workpiece and the first coating. The material of the second coating generally has a higher melting point than copper, and may include, but is not limited to, nickel. The second coating ensures that there is minimal diffusion of the first coating into the first metallic workpiece.

The bonded structure further has at least one joint where the first metallic workpiece and the second metallic workpiece are bonded via the arc welding process described above. The first metallic workpiece is wetted and brazed along the joint, which is made possible by the first coating due to its lower melting point. The second metallic workpiece is melted and fused along the joint.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1:
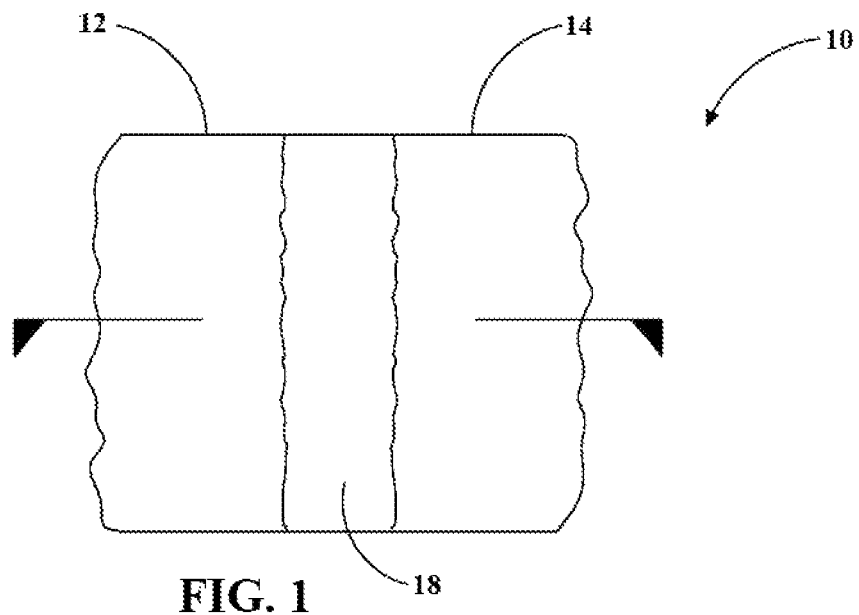
FIG. 1 is a schematic, plan view of a bonded structure of copper and aluminum.

Referring to the drawings, wherein like reference numbers correspond to like or similar components wherever possible throughout the several figures, a bonded structure 10 is shown in FIG. 1. The bonded structure 10 includes a first metallic workpiece made of copper (hereinafter, copper workpiece 12) and a second metallic workpiece made of aluminum (hereinafter, aluminum workpiece 14). While the first metallic workpiece and the second metallic workpiece are described as a copper workpiece 12 and an aluminum workpiece 14, respectfully, it should be appreciated that they may be made of any materials where the material of the first metallic workpiece has a higher melting point and a higher thermal conductivity than the second metallic workpiece.

Figure 2A:
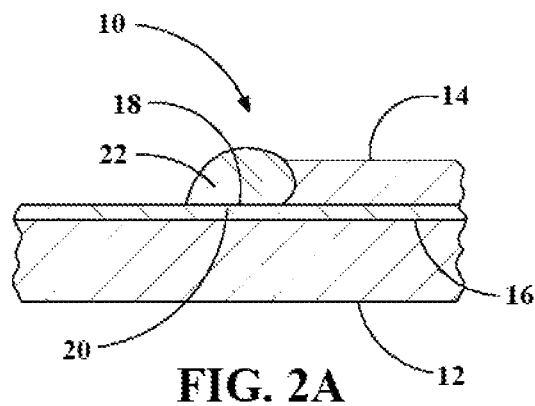
FIGS. 2A and 2B are schematic, cross-sectional views through the bonded structure of FIG. 1, where the copper and aluminum are joined by a lap weld, in accordance with embodiments of the present invention.
Figure 3A:
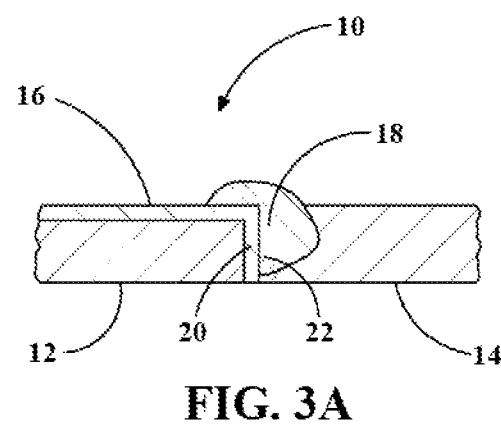
FIGS. 3A and 3B are schematic, cross-sectional views through the bonded structure of FIG. 1, where the copper and the aluminum are joined by a butt weld in accordance with other embodiments of the present invention.

FIGS. 2A and 3A depict cross-sections through the bonded structure 10, where the copper workpiece 12 and the aluminum workpiece 14 are bonded by a lap weld (FIG. 2) or a butt weld (FIG. 3). Referring to FIGS. 2 and 3, the copper workpiece 12 has a first coating 16 applied to at least a portion of the copper workpiece 12. The first coating 16 generally encompasses the area where the copper workpiece 12 and the aluminum workpiece 14 are bonded, or more specifically, the joint 18. The material of the first coating 16 generally has a higher melting point than copper, and may include, but is not limited to, zinc or the like. It should be appreciated that for embodiments in which the first metallic workpiece is made of a material other than copper, the material of the first coating 16 will also have a lower melting point than the material of the first metallic workpiece. The first coating 16 may be applied by an electrolytic plating process, or any other process known to a person of ordinary skill in the art.

Figure 2B:
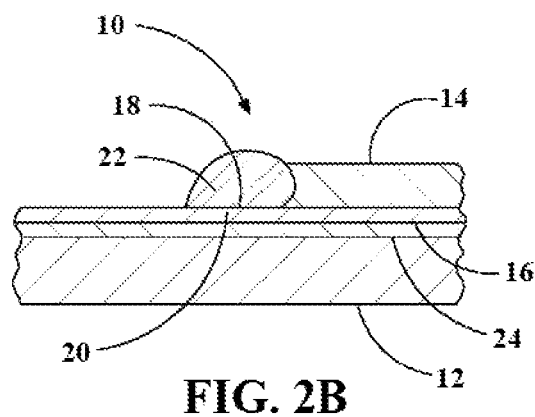
Figure 3B:
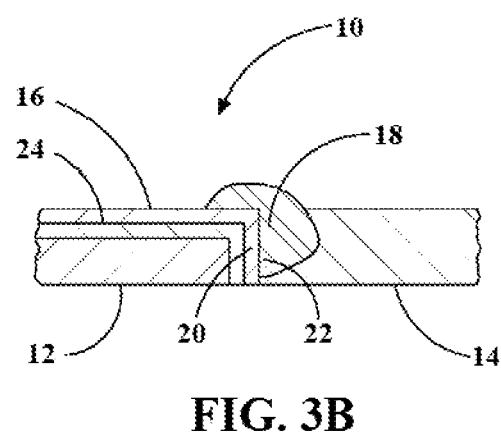

The copper workpiece 12 may further have an optional second coating 24, as depicted in FIGS. 2B and 3B. The second coating 24 generally is between the copper workpiece 12 and the first coating 16, as it is applied to the copper workpiece 12 prior to the first coating 16. The material of the second coating 24 generally has a higher melting point than copper, and may include, but is not limited to, nickel or the like. It should be appreciated that for embodiments in which the first metallic workpiece is made of a material other than copper, the material of the second coating 24 will also have a higher melting point than the material of the first metallic workpiece. The second coating 24 ensures that there is minimal diffusion of the first coating 16, the filler material used to bond the workpieces 12 and 14, and/or aluminum from the aluminum workpiece 14 into the copper workpiece 12. The second coating 24 may be applied by an electrolytic plating process, or any other process known to a person of ordinary skill in the art.

Figure 4A:
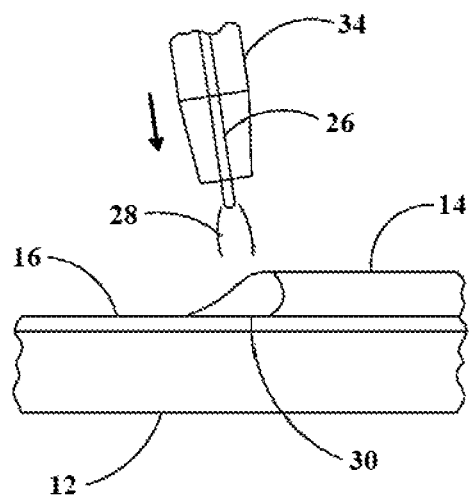
FIG. 4A is a schematic, front view illustrating a first stage of an arc welding process for bonding a copper workpiece and an aluminum workpiece to each other to form the bonded structure of FIGS. 1 and 2A.
Figure 4B:
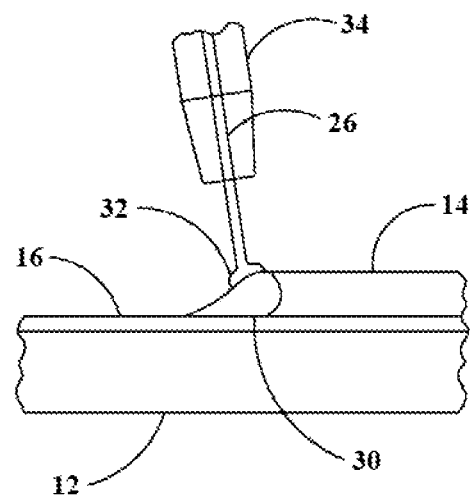
FIG. 4B is a schematic, front view illustrating a transition from the first stage illustrated in FIG. 4A to a second stage of the arc welding process.
Figure 4C:
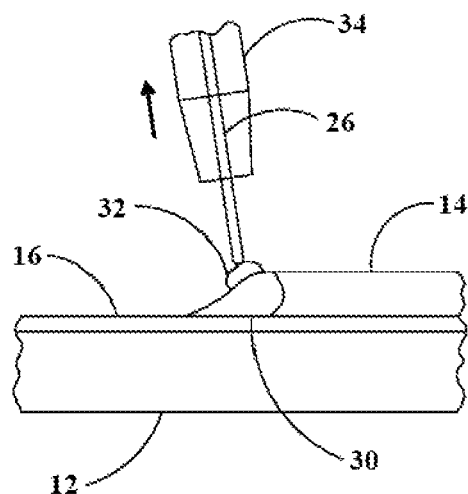
FIG. 4C is a schematic, front view illustrating the second stage of the arc welding process.

As mentioned above, the copper workpiece 12 and the aluminum workpiece 14 are bonded together at the joint 18 by a filler material, more specifically a welding wire 28, via an arc welding process, as illustrated in FIGS. 4A-4C and described hereinafter. It should be appreciated that the bonded structure 10 may have more than one joint 18 where the copper workpiece 12 and the aluminum workpiece 14 are bonded. The filler material mixes with the aluminum workpiece 14 such that the aluminum side 22 of the joint 18 is melted and fused. Furthermore, the filler material also mixes with the first coating 16, thereby preventing any forming of intermetallics between the copper and the aluminum, and/or between the copper and the filler material. This allows the copper side 20 of the joint 18 to be wetted and brazed.

FIGS. 4A-4C illustrate the arc-welding process as applied to the configuration of the bonded structure 10 depicted in FIGS. 1 and 2A. Referring to FIGS. 4A-4C, the arc welding process involves the cyclic alternating of a first stage, also known as an electric arc phase, in which a welding wire 26 is moved toward the workpieces 12 and 14 via a wire feeder 34, and a second stage, also known as a short-circuit phase, in which the welding wire 26 is moved away from the workpieces 12 and 14. The welding wire 26 may be made of, but is not limited to, an aluminum alloy. While FIGS. 4A-4C depict the copper workpiece 12 as having only the first coating 16, it should be appreciated that the copper workpiece 12 may also have the second coating 24, as depicted in FIG. 2B.

FIG. 4A illustrates the first stage. In this stage, an electric current is supplied to the welding wire 26 as it is being moved toward the workpieces 12 and 14. An electric arc 28 is formed between the welding wire 26 and the workpieces 12 and 14. The electric arc 28 heats the workpieces 12 and 14, causing a portion of the aluminum workpiece 14 and the first coating 16 to melt and fuse, thereby forming a weld pool 30. For the copper workpiece 12, only the first coating 16 melts and joins with the aluminum workpiece 14, again, so that intermetallics between the copper workpiece 12 and the aluminum workpiece 14 do not form.

FIG. 4B illustrates the transition from the first stage to the second stage. When the welding wire 26 comes into contact with the workpieces 12 and 14, more specifically the welding pool 30, a molten droplet 32 begins to form from the melting of the welding wire 26. The electric current is subsequently reduced such that the electric arc 28 is substantially removed, thereby beginning the second stage, which is colder than the first stage. This reduction in temperature may lead to low distortion and higher precision, as well as less splattering.

FIG. 4C illustrates the second stage. In this stage, the welding wire 26 is retracted. This helps detach the molten droplet 32 from the welding wire 26 and into the weld pool 30. After the welding wire 26 is in its original position, as depicted in FIG. 4A, the motion of the welding wire 26 is reversed again, being brought toward the workpieces 12 and 14, and thus beginning the next cycle of the alternating of the first stage and the second stage. The frequency at which the first stage and the second stage are alternated may take place up to seventy times per second. This process is continued along the entire length of the joint 18. When the weld pool 30 and the molten droplets 32 cool and solidify, the bond between the copper workpiece 12 and the aluminum workpiece 14 is formed.

The electric current supply, the movement of the welding wire 26, and other parameters may be controlled by a controller (not shown). This allows the molten droplets 32 to be precisely formed and placed along the joint 18 one at a time, which in turn, minimizes the amount of heat to form the bond such that the workpieces 12 and 14 do not overheat. The reduced heat allows very thin metal sections to be bonded together or with other metal workpieces. In addition, the control of the heat ensures that the copper side 20 of the joint 18 remains wetted and brazed to avoid the mixing of copper and aluminum. Furthermore, this process may reduce the amount of porosity present in the joint 18, thereby allowing maximum area for conducting electricity, which may be useful in such applications as battery tabs in hybrid electrical vehicles.

Figure 5:
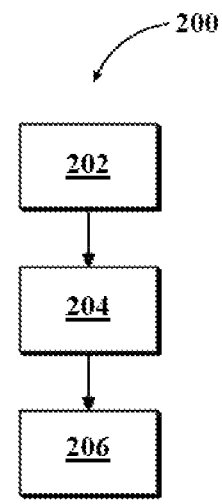
FIG. 5 is a schematic flow diagram illustrating a method for bonding a copper workpiece and an aluminum workpiece to each other.

Referring to FIG. 5, a method 200 for forming a bonded structure 10 including a copper workpiece 12 and an aluminum workpiece 14 is shown. While method 200 is described with respect to a copper workpiece 12 and an aluminum workpiece 14, it should be appreciated that method 200 may be applied to form any bonded structure of a first metallic workpiece and a second metallic workpiece, where the first metallic workpiece has a higher melting point and a higher thermal conductivity than the second metallic workpiece.

Method 200 begins at step 202 in which a first coating 16 is applied to at least a portion of a copper workpiece 12. As explained above, the first coating 16 generally has a lower melting point than copper, and may include, but is not limited to, zinc. Again, where the first metallic workpiece is made of a material other than copper, the material of the first coating 16 will still have a lower melting point than the other material of the first metallic workpiece. The first coating 16 may be applied via an electrolytic plating process, or any other process known to a person of ordinary skill in the art.

Prior to step 202, method 200 may include applying a second coating 24 to the same portion of the copper workpiece 12 that the first coating 16 is to be applied. Also as explained above, the optional second coating 24 generally has a higher melting point than copper, and may include, but is not limited to, nickel. Again, where the first metallic workpiece is made of a material other than copper, the material of the second coating 24 will still have a higher melting point than the other material of the first metallic workpiece. The second coating 24 may be applied to ensure that there is minimal diffusion of the first coating 16, the filler material, and/or aluminum into the copper workpiece 12. The second coating 24 may be applied via an electrolytic plating process, or any other process known to a person of ordinary skill in the art.

After step 202, method 200 proceeds to step 204. At step 204, the copper workpiece 12 and the aluminum workpiece 14 are positioned with respect to each other to form at least one joint 18 where the two workpieces 12 and 14 are to be bonded to each other.

After step 204, method 200 proceeds to step 206. At step 206, the copper workpiece 12 is welded to the aluminum workpiece 14 along the at least one joint 18 via an arc welding process. As a result of the arc welding process, the copper side 20 of the joint 18 will be wetted and brazed, and the aluminum side 22 of the joint 18 will be melted and fused.

As explained above, the arc welding process involves a cyclic alternating of a first stage, or electric arc phase, and a second stage, or a short-circuit phase, to generate and detach a plurality of molten droplets 32 along the at least one joint 18. Each molten droplet 32 is formed from a welding wire 26 that is moved toward the workpieces 12 and 14 in the first stage, and away from the workpieces 12 and 14 in the second stage. During the first stage, an electric current is supplied to the welding wire 26, generating an electric arc 28 that heats and melts the aluminum workpiece 14 and the first coating 16, thereby forming a weld pool 30. The electric current also heats the welding wire 26 to form the molten droplet 32. The retraction of the welding wire 26 in the second stage helps detach the molten droplet 32 from the welding wire 26 and into the weld pool 30. In addition, in the second stage, the electric current is reduced to minimize the amount of heat so that the workpieces 12 and 14 do not overheat. This process is repeated along the entire length of the at least one joint 18.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of bonding a first metallic workpiece and a second metallic workpiece having different melting points and thermal conductivities, the method comprising:

applying a first coating to at least a portion of the first metallic workpiece, the first coating being made of a material having a lower melting point than the material of the first metallic workpiece;

applying a second coating to the first metallic workpiece at substantially the same location as the first coating, prior to applying the first coating, wherein the second coating is made of a material having a higher melting point than the material of the first metallic workpiece;

positioning the first metallic workpiece and the second metallic workpiece with respect to each other to form at least one joint where the first and second metallic workpieces are to be bonded; and welding the first metallic workpiece to the second metallic workpiece along the at least one joint via an arc welding process including a welding wire such that the first metallic workpiece is wetted and brazed, and the second metallic workpiece is melted and fused along the at least one joint; and wherein the arc welding process involves a cyclic alternating of a first stage, in which an electric current is supplied to the welding wire as the welding wire is moved toward the first and second metallic workpieces, and a second stage, in which the electric current is reduced and the welding wire is moved away from the first and second metallic workpieces, to generate and detach a plurality of molten droplets along the at least one joint, the molten droplets being formed from the welding wire in the first stage.

2. The method of claim 1 wherein the materials of the first metallic workpiece and the second metallic workpiece are copper and aluminum, respectively.

3. The method of claim 1 wherein the material of the first coating is zinc.

4. The method of claim 1 wherein the material of the welding wire is an aluminum alloy.

5. The method of claim 1 wherein the material of the second coating is nickel.

6. The method of claim 1 wherein the first coating is applied via an electrolytic plating process.

7. A method of bonding an aluminum workpiece to a copper workpiece via an arc welding process including a welding wire, the method comprising:

applying a first coating to at least a portion of the copper workpiece, the first coating being made of a material having a lower melting point than copper;

applying a second coating to the copper workpiece at the same location as the first coating, prior to applying the first coating, wherein the second coating is made of a material having a higher melting point than copper;

positioning the copper workpiece and the aluminum workpiece with respect to each other to form at least one joint where the copper and aluminum workpieces are to be bonded;

welding the aluminum workpiece to the copper workpiece along the at least one joint via the arc welding process such that the aluminum workpiece is melted and fused, and the copper workpiece is wetted and brazed along the at least one joint; and wherein the arc welding process involves a cyclic alternating of a first stage, in which an electric current is supplied to the welding wire as the welding wire is moved toward the copper and aluminum workpieces, and a second stage, in which the electric current is reduced and the welding wire is moved away from the copper and aluminum workpieces, to generate and detach a plurality of molten droplets along the at least one joint, the molten droplets being formed from the welding wire in the first stage.

8. The method of claim 7 wherein the material of the first coating is zinc.

9. The method of claim 7 wherein the material of the welding wire is an aluminum alloy.

10. The method of claim 7 wherein the material of the second coating is nickel.

11. The method of claim 7 wherein the first coating is applied via an electrolytic plating process.

12. A bonded structure of copper and aluminum, the structure comprising:
- a first metallic workpiece made of copper;
- a first coating applied to at least a portion of the first metallic workpiece, the first coating being made of a material having a lower melting point than copper;
- a second coating applied to the first metallic workpiece beneath the first coating, the second coating being made of a material having a higher melting point than copper;
- a second metallic workpiece made of aluminum, the second metallic workpiece being positioned with respect to the first metallic workpiece to form at least one joint where the first and second metallic workpieces are bonded;

wherein the first metallic workpiece and the second metallic workpiece are bonded via an arc welding process including a welding wire such that the first metallic workpiece is wetted and brazed, and the second metallic workpiece is melted and fused along the joint; and wherein the arc welding process involves a cyclic alternating of a first stage, in which an electric current is supplied to the welding wire as the welding wire is moved toward the first and second metallic workpieces, and a second stage, in which the electric current is reduced and the welding wire is moved away from the first and second metallic workpieces, to generate and detach a plurality of molten droplets along the at least one joint, the molten droplets being formed from the welding wire in the first stage.

13. The bonded structure of claim 12 wherein the material of the first coating is zinc.

14. The bonded structure of claim 12 wherein the material of the welding wire is an aluminum alloy.

15. The bonded structure claim 12 wherein the material of the second coating is nickel.

* * * * *